(12) United States Patent
Ayukawa

(10) Patent No.: US 10,589,790 B2
(45) Date of Patent: Mar. 17, 2020

(54) VEHICLE BODY FRONT SECTION STRUCTURE

(71) Applicant: TOYOTA JIDOSHA KABUSHIKI KAISHA, Toyota-shi, Aichi-ken (JP)

(72) Inventor: Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 16/013,658

(22) Filed: Jun. 20, 2018

(65) Prior Publication Data

US 2019/0002026 A1 Jan. 3, 2019

(30) Foreign Application Priority Data

Jun. 30, 2017 (JP) ................. 2017-129470

(51) Int. Cl.
   *B62D 21/15* (2006.01)
   *B60K 1/04* (2019.01)
   *B62D 21/11* (2006.01)
   *B62D 25/08* (2006.01)

(52) U.S. Cl.
   CPC ............. *B62D 21/155* (2013.01); *B60K 1/04* (2013.01); *B62D 21/11* (2013.01); *B62D 21/152* (2013.01); *B62D 25/082* (2013.01); *B60K 2001/0438* (2013.01); *B60Y 2306/01* (2013.01)

(58) Field of Classification Search
   CPC ........... B60K 1/04; B60R 19/12; B62D 21/11; B62D 21/15; B62D 21/152; B62D 21/155

USPC .......... 296/187.09, 193.09, 203.02
   See application file for complete search history.

(56) References Cited

U.S. PATENT DOCUMENTS

| 8,567,849 | B2 * | 10/2013 | Rawlinson | B62D 21/152 |
| | | | | 296/187.09 |
| 8,646,792 | B2 * | 2/2014 | Young | B62D 21/155 |
| | | | | 280/124.109 |
| 9,764,629 | B2 * | 9/2017 | Schmalzrieth | B60K 1/04 |
| 9,937,781 | B1 * | 4/2018 | Bryer | B60K 1/04 |
| 2012/0097466 | A1 | 4/2012 | Usami et al. | |
| 2018/0272852 | A1 * | 9/2018 | Ajisaka | B62D 21/152 |
| 2018/0312198 | A1 * | 11/2018 | Shimizu | B62D 21/155 |

FOREIGN PATENT DOCUMENTS

| JP | 2012-91635 A | 5/2012 |
| JP | 2017-47761 A | 3/2017 |

* cited by examiner

*Primary Examiner* — Jason S Daniels
(74) *Attorney, Agent, or Firm* — Oliff PLC

(57) ABSTRACT

A vehicle body front section structure is provided including a battery pack, a lower cross member, and an impact absorbing structure. The battery pack is mounted at a vehicle lower side of a floor panel of a vehicle. The lower cross member is disposed at the vehicle lower side of a front cross member at a lower section of a front end of the vehicle, and extends along a vehicle width direction. The impact absorbing structure is provided between the lower cross member and the battery pack, and absorbs collision energy from collision load input from a vehicle front side.

2 Claims, 5 Drawing Sheets

VEHICLE BODY FRONT SECTION STRUCTURE

CROSS-REFERENCE TO RELATED APPLICATION

This application claims priority under 35 USC 119 from Japanese Patent Application No. 2017-129470 filed on Jun. 30, 2017, the disclosure of which is incorporated by reference herein in its entirety.

BACKGROUND

Technical Field

The present disclosure relates to a vehicle body front section structure.

Related Art

A floor structure of an electric vehicle described in Japanese Patent Application Laid-Open (JP-A) No. 2012-91635 discloses technology in which plural battery modules are supported by a frame shaped frame section enclosing front, rear, left, and right sides of a battery unit mounted under a floor. Front ends of both side portions of the frame shaped frame section are fixed to a suspension cross member, and both side portions of the frame shaped frame section are fixed to a floor cross member through fixing portions.

Namely, in JP-A No. 2012-91635, the frame shaped frame section is fixed to what are referred to vehicle body framework members such as the suspension cross member and the floor cross member. Thus, the rigidity of the battery unit is enhanced, and the rigidity of the vehicle body itself is also enhanced.

However, in the technology described in JP-A No. 2012-91635, there is still room for improvement regarding impact absorption performance, whereby impact energy is absorbed in a frontal collision of the vehicle (hereafter referred to as "in a vehicle head-on collision").

SUMMARY

The present disclosure provides a vehicle body front section structure capable of enhancing impact absorption performance, whereby impact energy is absorbed in a vehicle head-on collision.

A first aspect of the present disclosure is vehicle body front section structure including a battery pack, a lower cross member, and an impact absorbing structure. The battery pack is mounted at a vehicle lower side of a floor panel of a vehicle. The lower cross member is disposed at the vehicle lower side of a front cross member at a lower section of a front end of the vehicle, and extends along a vehicle width direction. The impact absorbing structure is provided between the lower cross member and the battery pack, and absorbs collision energy from collision load input from a vehicle front side.

In the first aspect, the battery pack is mounted at the vehicle lower side of the floor panel of the vehicle. The lower cross member is disposed at the lower section of the front end of the vehicle at the vehicle lower side of the front cross member and extends along the vehicle width direction. The impact absorbing structure is provided between the lower cross member and the battery pack. The impact absorbing structure absorbs collision energy from collision load input from a vehicle front side in a vehicle head-on collision.

Battery packs are generally set to have high rigidity and strength. Thus, in cases in which a member (what is referred to as an impact absorbing member, hereafter referred to as "impact absorbing member") that has a lower strength than the battery pack is installed between the lower cross member and the battery pack, when collision load from the vehicle front side is input in a vehicle head-on collision, the impact absorbing member undergoes plastic deformation due to reaction force received from the battery pack. The impact energy is thereby absorbed.

Namely, in the first aspect, by providing the impact absorbing structure at the front side of the battery pack, which generally has high rigidity and strength, reaction force received from the battery pack in a vehicle head-on collision is utilized so that the impact absorbing member configuring the impact absorbing structure is made to reliably undergo plastic deformation, and impact energy is effectively absorbed. Collision load input to the battery pack is reduced and the battery pack is commensurately protected as a result.

A second aspect of the present disclosure is the vehicle body front section structure of the first aspect, wherein the impact absorbing structure includes a suspension member that supports a front suspension.

In the second aspect, the impact absorbing structure includes the suspension member that supports the front suspension. When collision load from the vehicle front side is input in a vehicle head-on collision, the suspension member undergoes plastic deformation due to reaction force received from the battery pack. Impact energy is thereby absorbed.

A third aspect of the present disclosure is the vehicle body front section structure of the second aspect, wherein the suspension member includes a pair of suspension member side rails that are disposed so as to be spaced apart from each other in the vehicle width direction and that extend along a vehicle front-rear direction, and respective front side members extend along the vehicle front-rear direction at an upper side of the pair of suspension member side rails. In the third aspect, the impact absorbing structure includes a pair of suspension member side rail rears that configure a rear portion of the suspension member and extend along the vehicle front-rear direction, that have a vehicle front-rear direction front end portion joined to the suspension member side rails, and that have a vehicle front-rear direction rear end portion joined to the front side member and to the battery pack.

In the third aspect, the suspension member includes the pair of suspension member side rails that are disposed so as to be spaced apart from each other in the vehicle width direction and that extend along the vehicle front-rear direction. The front side members extend along the vehicle front-rear direction at the upper side of the suspension member side rails.

The impact absorbing structure is configured by the pair of suspension member side rail rears that configure a rear portion of the suspension member and extend along the vehicle front-rear direction. The vehicle front-rear direction front end portion of the suspension member side rail rears (hereafter referred to as "front end portion of the suspension member side rail rears") is joined to the suspension member side rails. The vehicle front-rear direction rear end portion of the suspension member side rail rears (hereafter referred to as "rear end portion of the suspension member side rail rears") is joined to the front side member and to the battery pack.

Thus, when collision load from the vehicle front side is input in a vehicle head-on collision, the suspension member side rail rears of the suspension member undergo plastic deformation due to reaction force received from the battery pack. The impact energy is thereby absorbed.

The battery pack is mounted at the vehicle lower side of the floor panel, such that the front side members are disposed further toward the front side than the battery pack. Thus, by joining the rear end portion of the suspension member side rail rears to the front side members and to the battery pack, collision load transmitted to the suspension member side rail rears in a vehicle head-on collision is also transmitted toward the front side members, such that impact energy is also absorbed by plastic deformation of the front side members. Collision load input to the battery pack is thereby reduced and the battery pack is commensurately protected.

A fourth aspect of the present disclosure is the vehicle body front section structure of the third aspect, wherein the vehicle front-rear direction rear end portion of the suspension member side rail rears is joined to a bottom plate of the battery pack from the vehicle lower side.

In the fourth aspect, since the rear end portion of the suspension member side rail rears is joined to the bottom plate of the battery pack from the vehicle lower side, the rear end portion of the suspension member side rail rear and the bottom plate of the battery pack are not disposed in the same plane.

Thus, even in cases in which the suspension member side rail rears move toward the vehicle rear side when collision load from the vehicle front side is input in a vehicle head-on collision, the suspension member side rail rears can be suppressed from intruding into the battery pack.

A fifth aspect of the present disclosure is the vehicle body front section structure of any one of the second aspect to the fourth aspect, wherein the impact absorbing structure further includes a pair of lower side members that are integrally formed to the lower cross member, that are disposed so as to be spaced apart from each other in the vehicle width direction and extend along a vehicle front-rear direction, and that have a vehicle front-rear direction rear end portion joined to the suspension member.

In the fifth aspect, the impact absorbing structure further includes the pair of lower side members that are integrally formed to the lower cross member. The lower side members are disposed so as to be spaced apart from each other in the vehicle width direction, extend along the vehicle front-rear direction, and have the vehicle front-rear direction rear end portion joined to the suspension member.

Thus, when collision load from the vehicle front side is input in a vehicle head-on collision, in addition to the suspension member, the lower side members also undergo plastic deformation due to reaction force received from the suspension member, and from the battery pack through the suspension member. This enables the amount of impact energy absorbed to be increased.

Note that here, "integrally formed" also includes cases in which the lower side members are integrated to the lower cross member by being joined by welding, fastening, or the like, in addition to configurations in which the lower side members are integrally formed to the lower cross member.

As explained above, the vehicle body front section structure according to the first aspect enables impact absorption performance, whereby impact energy is absorbed in a vehicle head-on collision, to be enhanced.

The vehicle body front section structure according to the second aspect enables impact energy in a vehicle head-on collision to be absorbed by the suspension member undergoing plastic deformation.

The vehicle body front section structure according to the third aspect enables the amount of impact energy absorbed in a vehicle head-on collision to be increased, due to the suspension member side rails configuring the rear portion of the suspension member undergoing plastic deformation, and by the front side members also undergoing plastic deformation.

The vehicle body front section structure according to the fourth aspect enables the side rails to be suppressed from intruding into the battery pack in a vehicle head-on collision.

The vehicle body front section structure according to the fifth aspect enables the amount of impact energy absorbed in a vehicle head-on collision to be increased, due to the lower side members undergoing plastic deformation in addition to the suspension member.

BRIEF DESCRIPTION OF THE DRAWINGS

Exemplary embodiments of the present disclosure will be described in detail based on the following figures, wherein.

DETAILED DESCRIPTION

Figure 1:
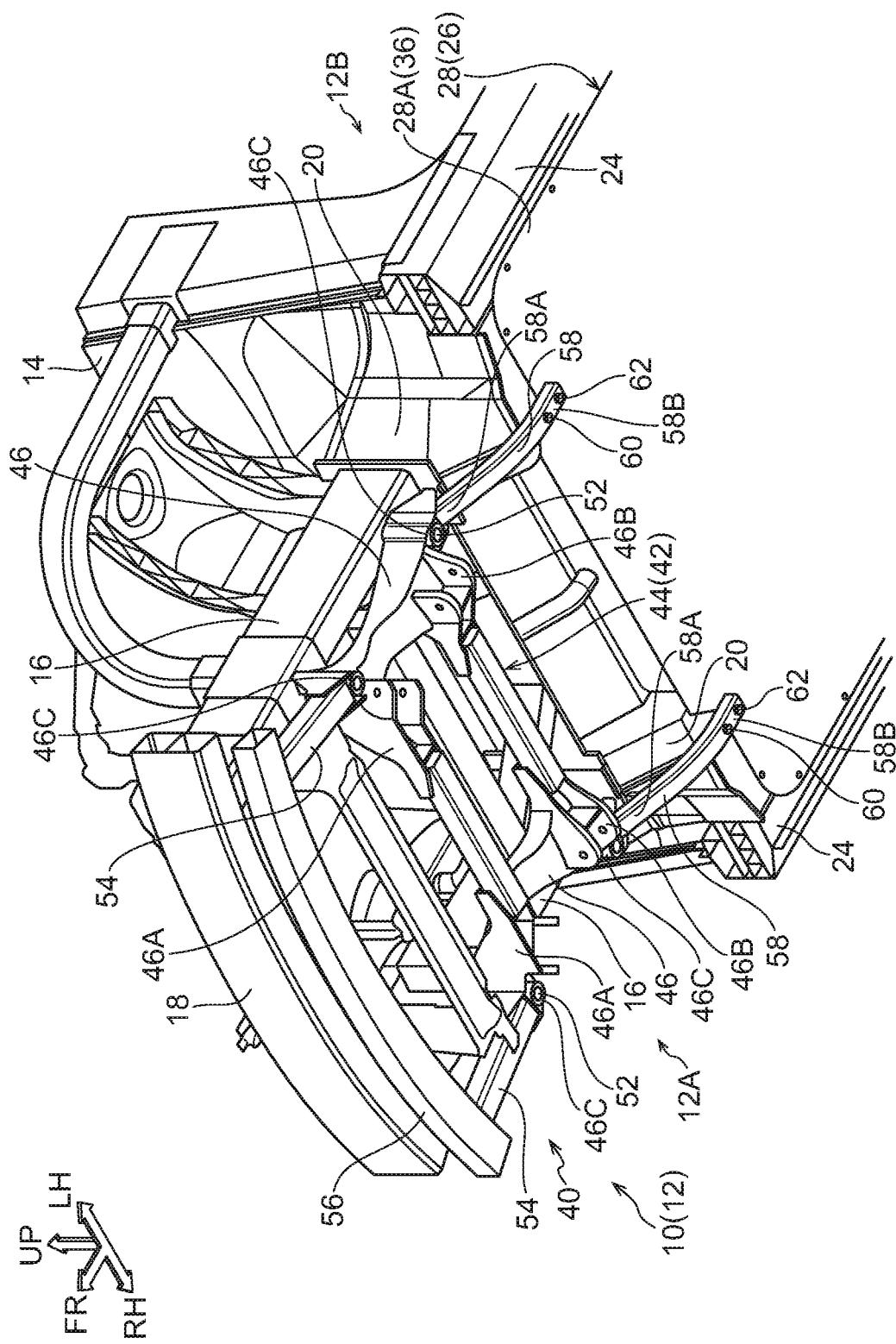
FIG. 1 is a schematic perspective view illustrating a vehicle body front section of a vehicle applied with a vehicle body front section structure of an exemplary embodiment, as viewed obliquely from the front lower left side.

Explanation follows regarding a vehicle body of an electric vehicle (vehicle) 12 applied with a vehicle body front section structure 10 according to an exemplary embodiment of the present disclosure, with reference to the drawings. Note that in each of the drawings as appropriate, the arrow FR, the arrow UP, the arrow LH, and the arrow RH respectively indicate toward the front (direction of progress), upward, toward the left, and toward the right of a vehicle. In the following explanation, unless specifically stated otherwise, simple reference to the front-rear, left-right, and up-down directions refers to front-rear in the vehicle front-rear direction, left-right in the vehicle left-right direction (vehicle width direction), and up-down in the vehicle vertical direction. Moreover, in the drawings, some reference numerals may be omitted in order to aid understanding of the drawings.

Configuration of Vehicle Body Front Section Structure

Explanation follows regarding configuration of the vehicle body front section structure 10 according to the present exemplary embodiment.

As illustrated in FIG. 1, the vehicle 12 is an electric vehicle, and includes a power unit chamber 12A and a vehicle cabin 12B. The power unit chamber 12A and the vehicle cabin 12B are partitioned by a dash panel 14, and the power unit chamber 12A is disposed at the front side of the vehicle cabin 12B. Although not illustrated in the drawings, various members, such as electrical components, a gear box, and auxiliary equipment, can be housed inside the power unit chamber 12A. A left and right pair of front side members 16 are disposed in the power unit chamber 12A so as to extend along the vehicle front-rear direction at respective vehicle width direction side sections of the vehicle 12.

The front side members 16 each configure a vehicle framework member. A front cross member (also referred to as bumper reinforcement) 18 that extends along the vehicle width direction at a front end of the vehicle is joined by welding, fastening, or the like to front ends of the front side members 16. Note that in the following explanation, explanation of the method by which members are joined together is omitted in cases in which the joining method is not particularly specified. A separate crush box, serving as an impact absorbing member, may of course be interposed between the front end of each front side member 16 and the front cross member 18.

Figure 2:
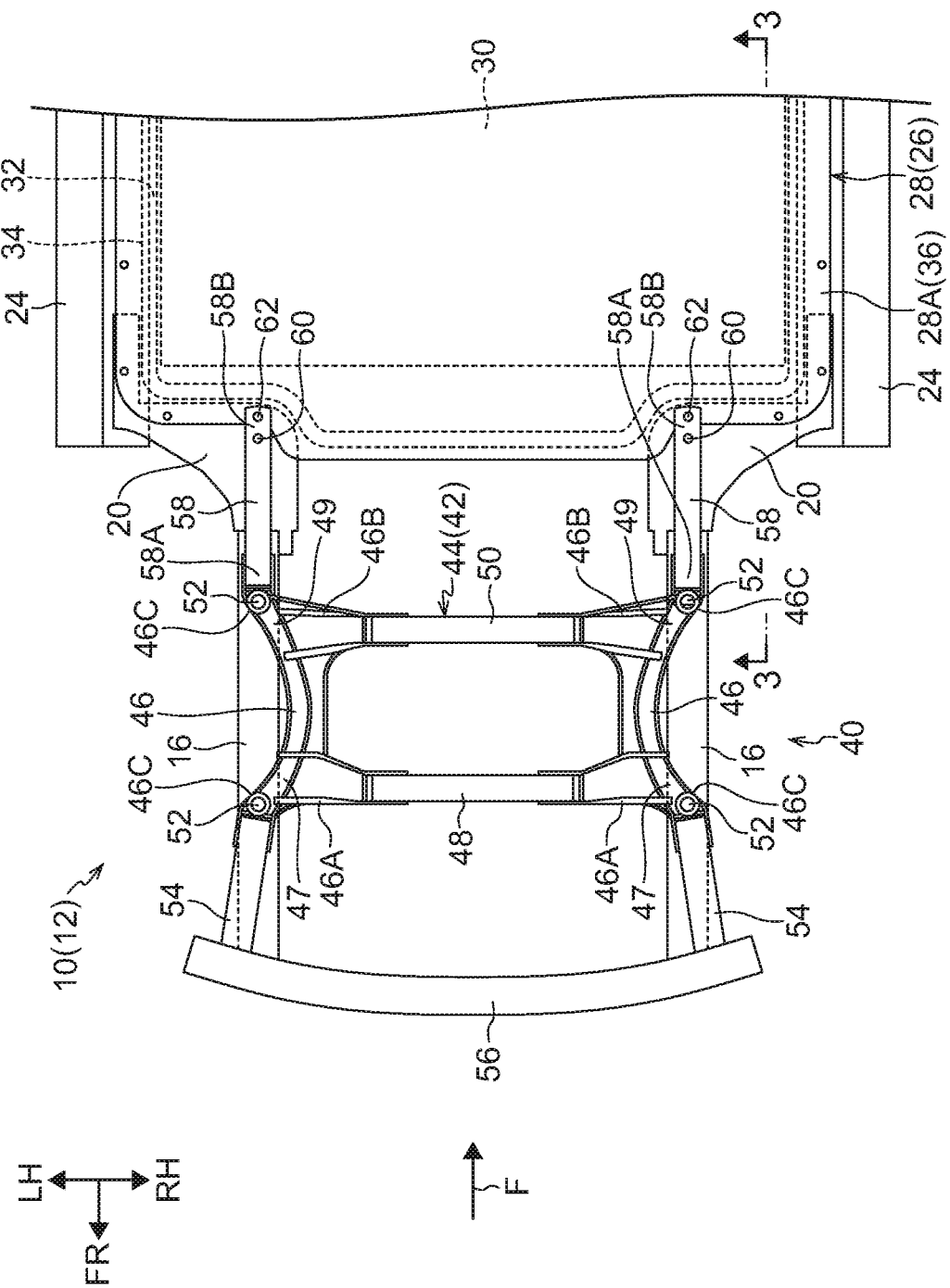
FIG. 2 is a lower face view illustrating a configuration of a vehicle body front section of a vehicle applied with a vehicle body front section structure of the present exemplary embodiment.
Figure 3:
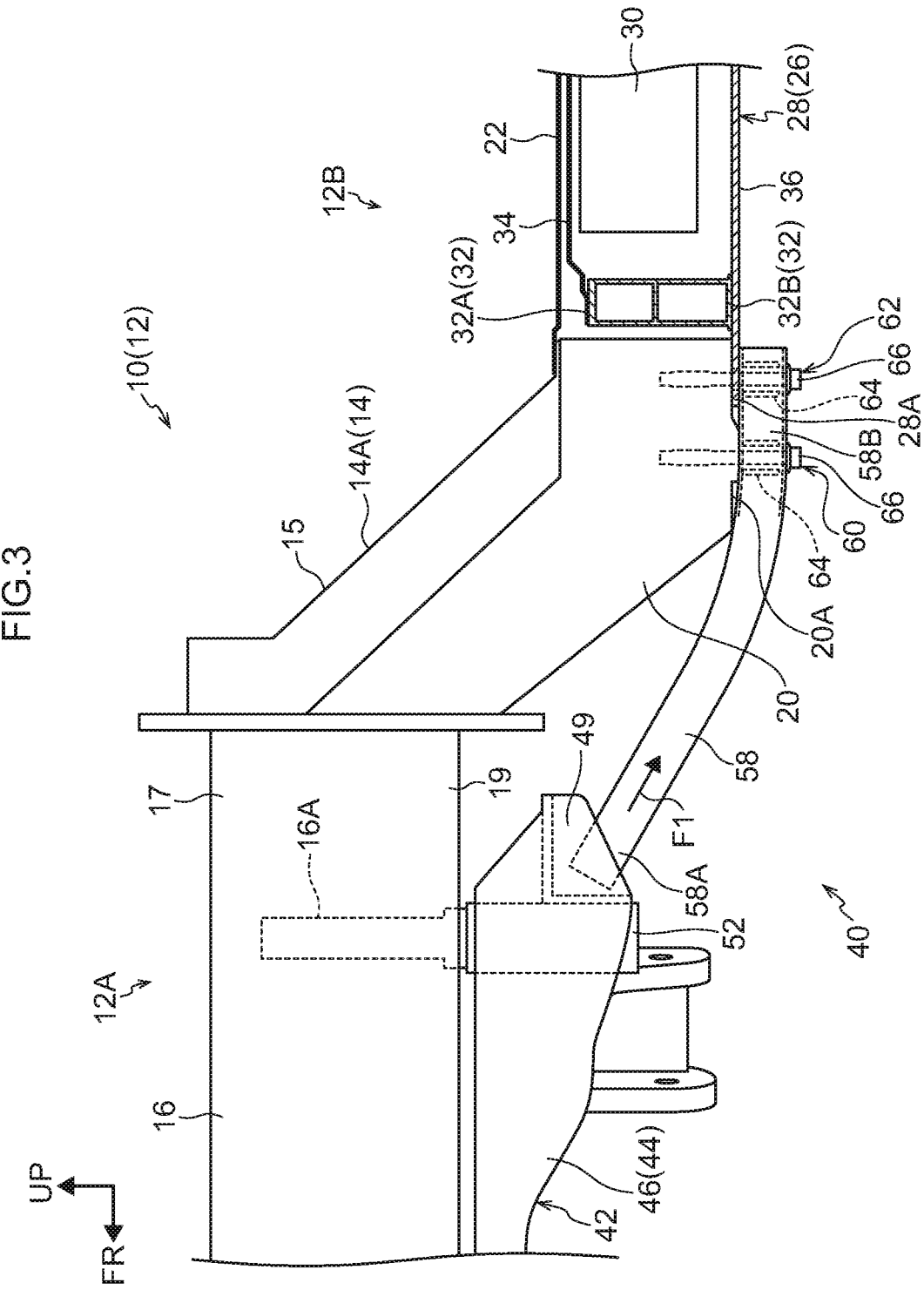
FIG. 3 is a cross-section sectioned along line 3-3 in FIG. 2.

As illustrated in FIG. 3, an upper portion 17 of a rear end of each front side member 16 is joined to the dash panel 14, and a lower portion 19 of the rear end of each front side member 16 is joined to a side member rear 20 forming part of the front side member 16. Note that, as illustrated in FIG. 1 and FIG. 2, a left and right pair of rockers 24 are provided extending along the vehicle front-rear direction at respective vehicle width direction outer sides of a floor panel 22 configuring a floor section of the vehicle cabin 12B. The side member rears 20 are respectively joined to front ends of the rockers 24 and to kick portions 14A positioned at a lower section 15 of the dash panel 14.

The left and right pair of rockers 24 are vehicle framework members that each have a closed cross-section structure. A battery pack 26 for supplying electricity to a power unit such as a motor is installed at the lower side of the floor panel 22 between the pair of rockers 24. The battery pack 26 is formed in a flat, substantially rectangular block shape, and is mounted to substantially the entire surface beneath the floor of the vehicle cabin 12B.

As illustrated in FIG. 2 and FIG. 3, the battery pack 26 includes a battery case 28 with its length along the vehicle front-rear direction and formed in a flattened box shape in the vehicle vertical direction. Plural battery modules 30 are housed inside the battery case 28. The battery modules 30 are configured by plural rectangular storage batteries.

Note that the battery case 28 includes a peripheral wall 32 forming a rectangular frame shape in plan view, a rectangular frame shaped top plate 34 provided above the peripheral wall 32, and a rectangular frame shaped bottom plate 36 provided below the peripheral wall 32. An elongated extrusion-molded component, formed by extrusion-molding a light metal such as an aluminum alloy, is bent into a rectangular frame shape and both length direction end portions thereof are linked together to form the peripheral wall 32 of the battery case 28. As illustrated in FIG. 3, a cross-section of the peripheral wall 32 of the battery case 28 sectioned along a direction orthogonal to the peripheral direction (the length direction of the extrusion-molded component) is substantially B-shaped.

The top plate 34 of the battery case 28 is formed by pressing a sheet material formed of an aluminum alloy or the like, and is joined to an upper face of an upper wall portion 32A of the peripheral wall 32 by plural bolts (not illustrated in the drawings).

The bottom plate 36 of the battery case 28 is formed by pressing a sheet material formed of an aluminum alloy or the like, and is fixed to a lower face of a lower wall portion 32B of the peripheral wall 32 by welding or riveting, for example. As illustrated in FIG. 1 and FIG. 3, a joint flange 28A that juts further to the vehicle outer sides in the vehicle horizontal direction than the peripheral wall 32 is provided to the bottom plate 36 about the entire periphery of the peripheral wall 32.

Note that, as illustrated in FIG. 1 and FIG. 2, an impact absorbing structure 40 is provided at the lower side of the front side members 16 in the vehicle body front section structure 10 according to the present exemplary embodiment. The impact absorbing structure 40 includes a suspension member 42 that supports, for example, a front suspension, not illustrated in the drawings. The suspension member 42 is configured including a pair of suspension member side rails 46, a front cross member 48, and a rear cross member 50.

The suspension member side rails 46 are configured as a left and right pair extending along the vehicle front-rear direction at respective vehicle width direction sides of the suspension member 42, and, as illustrated in FIG. 2, each have a vehicle front-rear direction center portion formed so as to gently curve in a convex shape toward the vehicle width direction inner side.

A side front end portion 46A is provided projecting toward the vehicle width direction inner side at a front end portion 47 of each suspension member side rail 46. A side rear end portion 46B is provided projecting toward the vehicle width direction inner side at a rear end portion 49 of each suspension member side rail 46. The front cross member 48 spans between the opposing side front end portions 46A of the pair of suspension member side rails 46. The rear cross member 50 spans between the opposing side rear end portions 46B of the pair of suspension member side rails 46.

Bolt fastening portions 46C are formed to the front end portions 47 and the rear end portions 49 of the suspension member side rails 46. A bolt 52 is inserted into each bolt fastening portion 46C from the lower side thereof, thereby fastening (joining) the bolt fastening portions 46C to respective bolt fastening portions 16A formed to the front side members 16 as illustrated in FIG. 3. Namely, each suspension member side rail 46 is supported at the front end portion 47 and the rear end portion 49 thereof so as to be suspended below the respective front side member 16 via the bolts 52.

Note that the side front end portion 46A and the side rear end portion 46B are integrally formed to each suspension member side rail 46 illustrated in FIG. 2. The suspension member side rail 46, the side front end portion 46A and the side rear end portion 46B are made, for example, of die-cast aluminum with an aluminum alloy or the like as the main material. The front cross member 48 and the rear cross member 50 are aluminum extrusion-molded parts formed by extrusion-molding an aluminum alloy or the like.

Lower side members 54 are joined to the respective front end portions 47 of the pair of suspension member side rails 46. Each lower side member 54 has a closed cross-section structure formed in an angular tube shape, and extends along the vehicle front-rear direction from a front end of the respective suspension member side rail 46 toward the vehicle front.

A lower cross member 56 is attached to front ends of the lower side members 54. The lower cross member 56 extends along the vehicle width direction, and, as illustrated in FIG. 1, is disposed at the lower side of the front cross member 18 so as to overlap the front cross member 18 in the vehicle vertical direction.

As illustrated in FIG. 2, a front end portion 58A of a suspension member side rail rear 58 is joined to the rear end portion 49 of each of the pair of suspension member side rails 46. As illustrated in FIG. 3, each suspension member side rail rear 58 extends so as to curve in a convex shape toward the vehicle lower side on progression from the rear end portion 49 of the suspension member side rail 46 toward the vehicle lower side and vehicle rear side.

For example, each suspension member side rail rear 58 has a closed cross-section structure formed in an angular tube shape, and is an aluminum extrusion-molded part manufactured by extrusion-molding aluminum. Joint portions 60, 62 are provided in the vehicle front-rear direction at a rear end portion 58B of each suspension member side rail rear 58. A collar 64 through which a bolt 66 can be inserted is provided inside the suspension member side rail rear 58 at each of the joint portions 60, 62.

Note that the joint portion 60 is disposed at the front side of the joint portion 62. The joint portion 60 abuts a lower wall 20A of the respective side member rear 20 from the lower side. The joint portion 62 abuts the lower wall 20A of the side member rear 20 from the lower side with the bottom plate 36 (joint flange 28A) of the battery case 28 (battery pack 26) interposed therebetween.

Nuts, not illustrated in the drawings, are respectively provided on the lower wall 20A side of the side member rear 20 at positions corresponding to the joint portions 60, 62. Each suspension member side rail rear 58 is fastened (joined) to the lower wall 20A of the respective side member rear 20 at the joint portion 60 using the bolt 66 and the nut. Each suspension member side rail rear 58 is fastened (joined) to the lower wall 20A of the respective side member rear 20 and to the bottom plate 36 of the battery case 28 interposed therebetween at the joint portion 62.

Operation of Vehicle Body Front Section Structure

Explanation follows regarding operation of the vehicle body front section structure 10 according to the present exemplary embodiment.

As illustrated in FIG. 1 and FIG. 2, in the present exemplary embodiment, the battery pack 26 is mounted at the lower side of the floor panel 22 of the vehicle 12. The lower cross member 56 extends along the vehicle width direction at a front end lower section of the vehicle 12, and the impact absorbing structure 40 is provided between the lower cross member 56 and the battery pack 26. Specifically, the lower side members 54, a suspension member body 44, and the suspension member side rail rears 58, together serving as the impact absorbing structure 40, are provided between the lower cross member 56 and the battery pack 26.

In the present exemplary embodiment, collision energy due to collision load F (see FIG. 2) input from the vehicle front side in a head-on collision of the vehicle 12 is absorbed by the lower side members 54, the suspension member body 44, and the suspension member side rail rears 58.

The battery pack 26 is generally set to have high rigidity and strength. Thus, in cases in which an impact absorbing member (not illustrated in the drawings) that has a lower strength than the battery pack 26 is installed between the lower cross member 56 and the battery pack 26, when collision load F from the vehicle front side is input in a head-on collision of the vehicle 12, the impact absorbing member undergoes plastic deformation due to reaction force received from the battery pack 26. The impact energy is thereby absorbed.

Namely, in the present exemplary embodiment, the joint portions 60, 62 are provided to the rear end portions 58B of the suspension member side rail rears 58. The suspension member side rail rears 58 are joined to the lower walls 20A of the respective side member rears 20 at the joint portions 60, and the suspension member side rail rears 58 are joined to the lower walls 20A of the respective side member rears 20 with the bottom plate 36 of the battery case 28 interposed therebetween at the joint portions 62.

Thus, when collision load F from the vehicle front side is input in a head-on collision of the vehicle 12, reaction force from the battery pack 26 can be received through the joint portions 62 of the suspension member side rail rears 58.

In this manner, reaction force received from the battery pack 26 is utilized so that the lower side members 54, the suspension member body 44, and the suspension member side rail rears 58 are made to reliably undergo plastic deformation. The impact energy is thereby effectively absorbed, such that collision load input to the battery pack 26 is reduced and the battery pack 26 is commensurately protected as a result. Namely, the present exemplary embodiment enables impact absorption performance, in which impact energy is absorbed, to be enhanced in a head-on collision of the vehicle 12.

Moreover, as illustrated in FIG. 2 and FIG. 3, in the present exemplary embodiment, the joint portions 60, 62 are provided along the vehicle front-rear direction at the rear end portions 58B of the suspension member side rail rears 58. The suspension member side rail rears 58 are joined to the lower walls 20A of the respective side member rears 20 at the joint portions 60. Moreover, the suspension member side rail rears 58 are joined to the lower walls 20A of the respective side member rears 20 with the bottom plate 36 of the battery pack 26 interposed therebetween at the joint portions 62.

The rear end portions 58B of the suspension member side rail rears 58 are joined to the respective side member rears 20 and to the battery pack 26 in this manner. Thus, collision load F1 (see FIG. 3) transmitted to the suspension member side rail rears 58 in a head-on collision of the vehicle 12 is also transmitted toward the side member rears 20, such that impact energy is also absorbed by plastic deformation of the side member rears 20. The collision load input to the battery pack 26 is thereby reduced and the battery pack 26 is commensurately protected.

In the present exemplary embodiment, the rear end portions 58B of the suspension member side rail rears 58 are joined to the bottom plate 36 of the battery pack 26 from the lower side. Namely, the rear end portions 58B of the suspension member side rail rears 58 are disposed at the lower side of the bottom plate 36 of the battery pack 26, and the rear end portions 58B of the suspension member side rail rears 58 and the bottom plate 36 of the battery pack 26 are not disposed on the same plane.

Thus, even in cases in which the suspension member side rail rears 58 move toward the vehicle rear side when collision load F from the vehicle front side is input in a head-on collision of the vehicle 12, the suspension member side rail rears 58 can be suppressed from intruding into the battery pack 26.

Generally vehicles types include front-wheel drive vehicles in which the front wheels are driven, rear-wheel drive vehicles in which the rear wheels are driven, and four-wheel drive vehicles in which the front wheels and rear wheels are driven. Electric vehicles have fewer component parts, such as fuel tanks and exhaust pipes, than vehicles with internal combustion engines, such that it is easier to manufacture electric vehicles with different vehicle types. However, when considering how to manage a vehicle head-on collision, the balance of the center of gravity in the vehicle front-rear direction differs between electric vehicles with front-wheel drive and electric vehicles with rear-wheel drive, such that it is difficult to manufacture different vehicle types using the same body, and reinforcement needs to be configured by vehicle type.

Figure 4A:
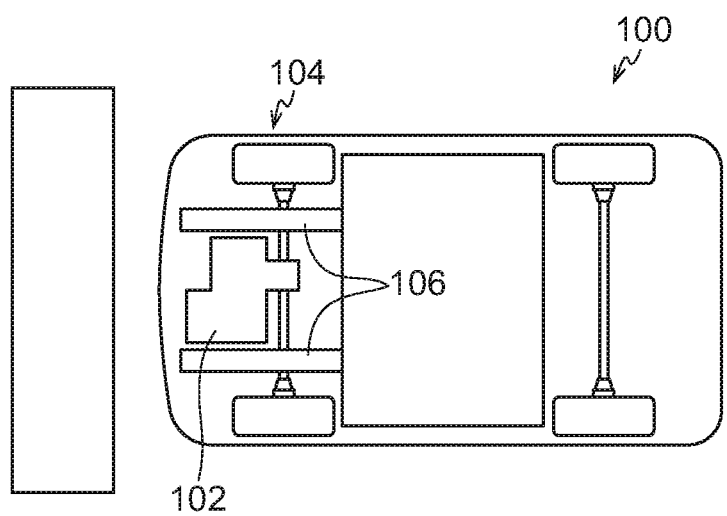
FIG. 4A is a schematic plan view illustrating a state prior to a head-on collision in a front-wheel drive vehicle illustrated as a comparative example.

As illustrated in FIG. 4A as a comparative example, in the case of a front-wheel drive electric vehicle (vehicle) 100, a motor 102 is provided to a vehicle front section 104. Thus, as illustrated in FIG. 4B, when collision load F' is input from the vehicle front side in a head-on collision of the vehicle 100, impact energy from the collision load F' is absorbed by vehicle framework members 106 configuring the vehicle front section 104 of the vehicle 100, and by the motor 102.

Figure 5A:
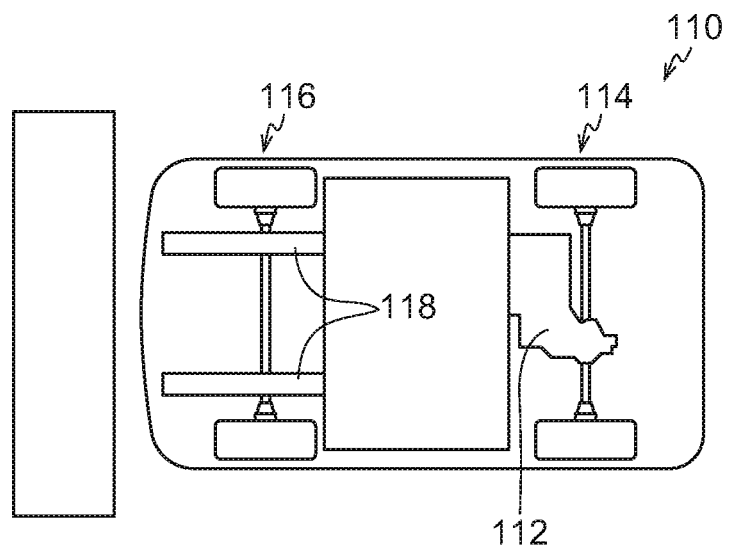
FIG. 5A is a schematic plan view illustrating a state prior to a head-on collision in a rear-wheel drive vehicle illustrated as a comparative example.

However, as illustrated in FIG. 5A as a comparative example, in the case of a rear-wheel drive electric vehicle (vehicle) 110, a motor 112 is provided to a vehicle rear section 114. Thus, as illustrated in FIG. 5B, when collision load F' is input from the vehicle front side in a head-on collision of the vehicle 110, impact energy from the collision load F' is absorbed by vehicle framework members 118 configuring a vehicle front section 116 of the vehicle 110.

Figure 4B:
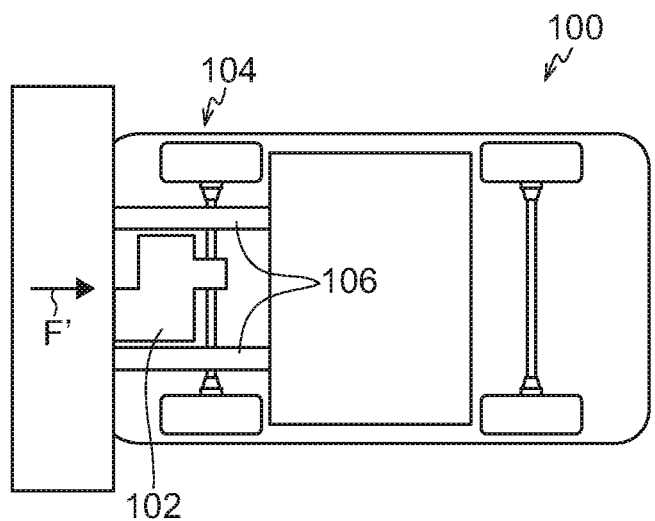
FIG. 4B is a schematic plan view illustrating a state after a head-on collision in a front-wheel drive vehicle illustrated as a comparative example.
Figure 5B:
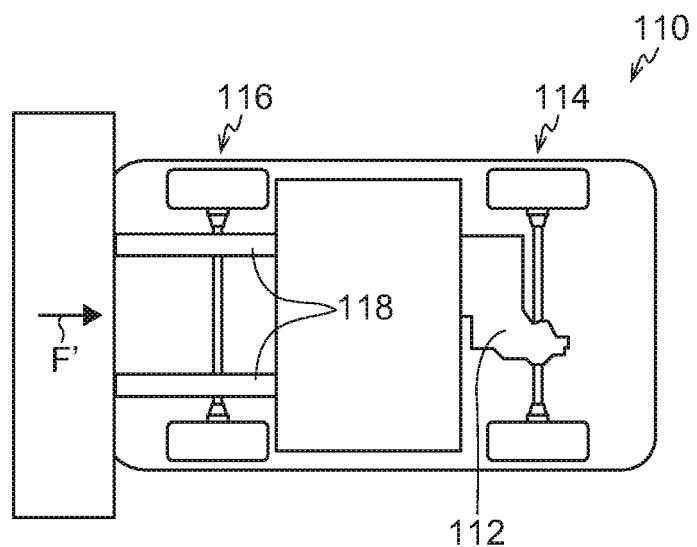
FIG. 5B is a schematic plan view illustrating a state after a head-on collision in a rear-wheel drive vehicle illustrated as a comparative example.

Namely, as illustrated in FIG. 4B and FIG. 5B, in cases in which different vehicle types are manufactured using the same body, the front-wheel drive vehicle 100 and the rear-wheel drive vehicle 110 have different amounts of impact energy absorption in a head-on collision of the vehicle 100, 110. Thus, when manufacturing different vehicle types using the same body, impact energy occurring in a head-on collision of the vehicle 100, 110 needs to be sufficiently absorbed by the vehicle framework members 106, 118, regardless of whether or not the motor 102, 112 is present.

As illustrated in FIG. 1 and FIG. 2, in the present exemplary embodiment, the lower side members 54, the suspension member body 44, and the suspension member side rail rears 58, these being vehicle framework members serving as the impact absorbing structure 40, are provided between the lower cross member 56 extending along the front end lower section of the vehicle 12 and the battery pack 26 mounted at the lower side of the floor panel 22.

This enables the amount of impact energy absorbed to be increased compared to cases in which only the suspension member body 44 is provided between the lower cross member 56 and the battery pack 26. Thus, the present exemplary embodiment enables different vehicle types, namely, front-wheel drive, rear-wheel drive, and four-wheel drive vehicles, to be manufactured using the same body.

Note that in the present exemplary embodiment, the suspension member side rail rears 58 configure part of the suspension member 42 by serving as rear portions of the suspension member 42. However, the suspension member side rail rears 58 may obviously be configured as separate members to the suspension member 42.

Similarly to the suspension member side rail rears 58, in the present exemplary embodiment, the side member rears 20 configure part of the respective front side members 16 by serving as rear portions of the respective front side members 16. However, the side member rears 20 may obviously be configured as separate members to the respective front side members 16.

Furthermore, although the lower side members 54 are provided in the present exemplary embodiment, the lower side members 54 are not absolutely necessary.

Although an exemplary embodiment of the present disclosure has been explained above, exemplary embodiments of the present disclosure are not limited to the above. Obviously, the exemplary embodiment may be combined with various modified examples, and various other modifications may be implemented within a range not departing from the spirit of the present disclosure.

What is claimed is:

1. A vehicle body front section structure comprising:
   a battery pack that is mounted at a vehicle lower side of a floor panel of a vehicle;
   a lower cross member that is disposed at the vehicle lower side of a front cross member at a lower section of a front end of the vehicle, and that extends along a vehicle width direction; and
   an impact absorbing structure that is provided between the lower cross member and the battery pack, the impact absorbing structure including a suspension member that supports a front suspension, the impact absorbing structure configured to absorb collision energy from collision load input from a vehicle front side, wherein:
   the suspension member includes a pair of suspension member side rails and a pair of suspension member side rail rears that configure a rear portion of the suspension member,
   the pair of suspension member side rails are disposed so as to be spaced apart from each other in the vehicle width direction and extend along a vehicle front-rear direction, respective front side members extending along the vehicle front-rear direction at an upper side of the pair of suspension member side rails,
   the pair of suspension member side rail rears extend along the vehicle front-rear direction, have a vehicle front-rear direction front end portion joined to the suspension member side rails, and have a vehicle front-rear direction rear end portion joined to the front side member and to the battery pack, and
   the vehicle front-rear direction rear end portion of the suspension member side rail rears is disposed at the vehicle lower side of a bottom plate of the battery pack, and is joined to the bottom plate of the battery pack from the vehicle lower side.

2. The vehicle body front section structure of claim 1, wherein:
   the impact absorbing structure further includes a pair of lower side members that are integrally formed to the lower cross member, that are disposed so as to be spaced apart from each other in the vehicle width direction and extend along a vehicle front-rear direction, and that have a vehicle front-rear direction rear end portion joined to the suspension member.

* * * * *